(No Model.) 2 Sheets—Sheet 1.
S. S. ADKINS.
VALVE FOR AUTOMATIC FIRE EXTINGUISHERS.
No. 523,923. Patented July 31, 1894.
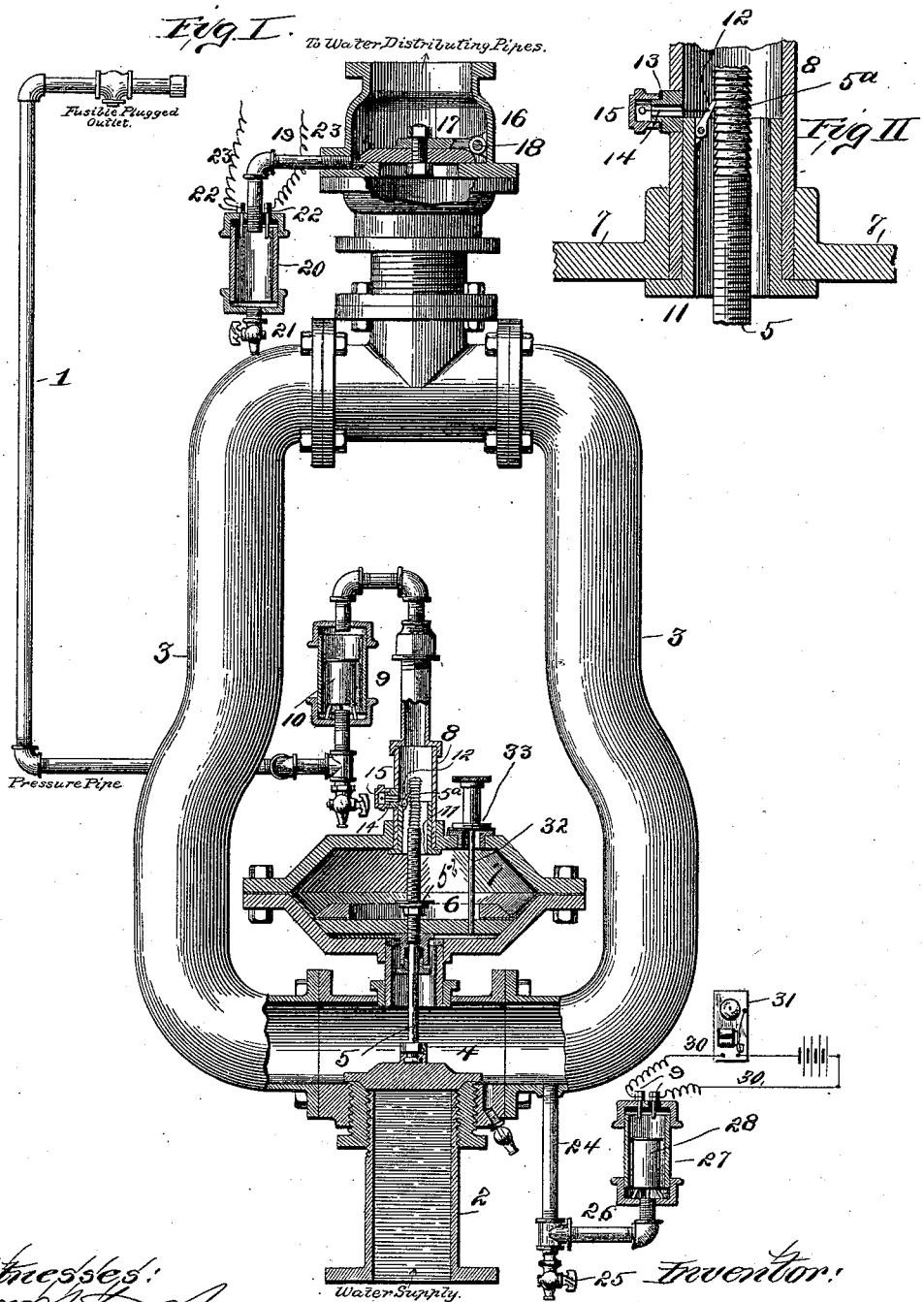

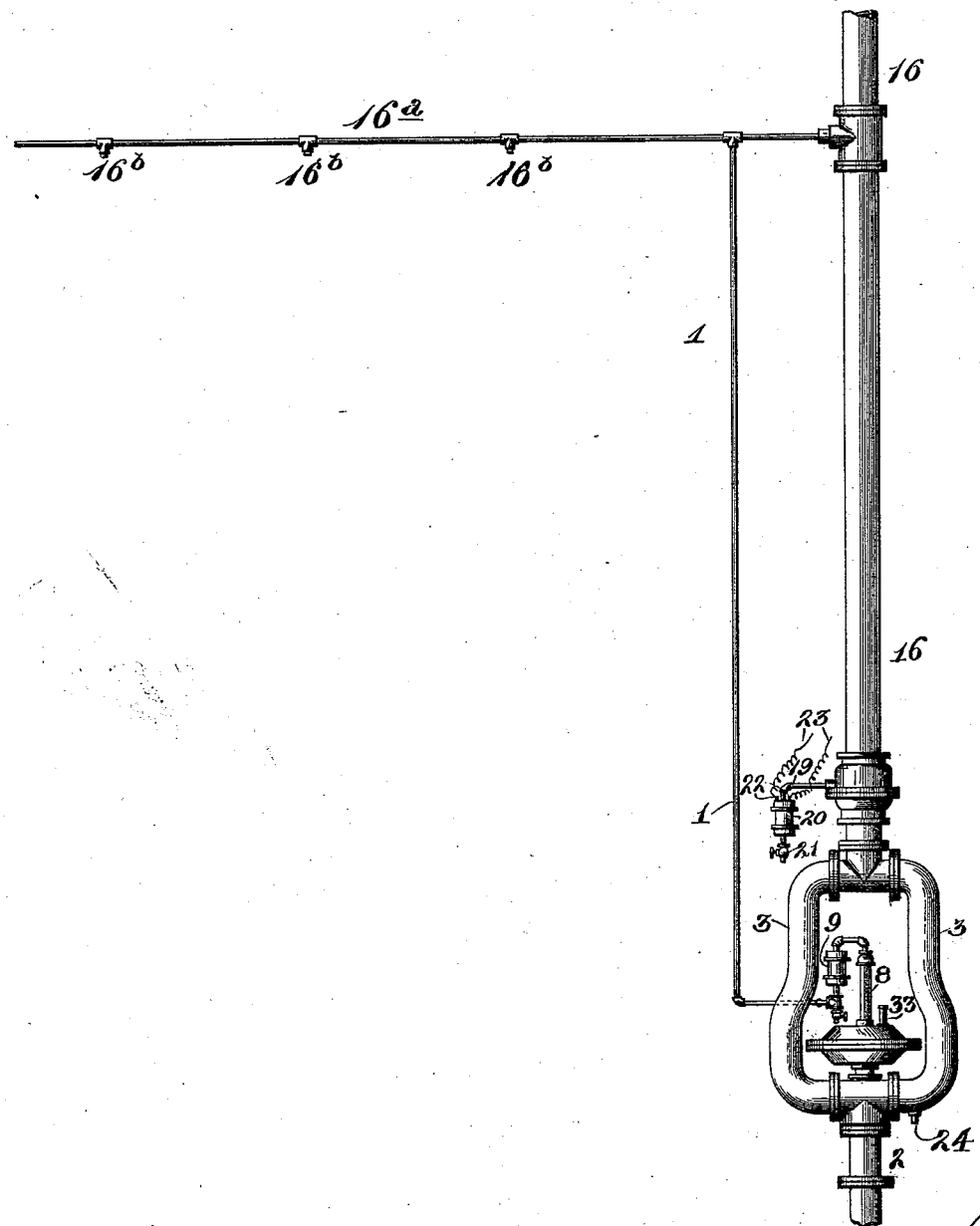

UNITED STATES PATENT OFFICE.

SAMUEL S. ADKINS, OF ST. LOUIS, MISSOURI.

VALVE FOR AUTOMATIC FIRE-EXTINGUISHERS.

SPECIFICATION forming part of Letters Patent No. 523,923, dated July 31, 1894.

Application filed November 4, 1892. Serial No. 450,969. (No model.)

*To all whom it may concern:*

Be it known that I, SAMUEL S. ADKINS, of the city of St. Louis, in the State of Missouri, have invented a certain new and useful Improvement in Valves for Automatic Fire-Extinguishers, of which the following is a full, clear, and exact description, reference being had to the accompanying drawings, forming part of this specification.

My invention relates to a controlling device for automatic fire extinguishers which is used with a system of water pipes adapted to receive and convey water to all parts of a building, and a pipe ordinarily containing air which is under pressure, and in communication with the said water pipes and a diaphragm which, through valves opposes the entrance of water into the water pipes. The said water distributing pipes contain a number of fusible plugged vents, which when a fire takes place, melt and permit the escape of air pressure from them and the pressure pipes, and relieve the pressure on the diaphragm, so that the water may force its valves open and pass from the supply pipe into the distributing pipes, and escape through sprinklers on the fire in the building.

My invention consists in features of novelty hereinafter fully described and pointed out in the claims.

In the drawings, Figure I represents a side elevation of my improved valve. Fig. II represents a vertical detail section illustrating a detent device for holding the water pipe valve in raised position when the valve has once opened, and Fig. III is a front elevation of my valve on a small scale, showing the pressure pipe and water distributing pipe provided with the fusible plugs connected therewith.

Referring to the drawings, 1 represents a pipe arranged to contain air under pressure and to be connected with my improved valve at one end and with the water distributing pipe 16ª. The distributing pipes are provided with openings stopped by means of fuse plugs 16ᵇ, of sufficient strength to resist the pressure of air within the pressure and distributing pipes, which plugs, as soon as the heat of a fire reaches them, will melt and allow the escape of air from the pipes and the consequent reduction of pressure therein, which allows the water to open the valves and escape through the openings from which the fuses have been burned.

2 represents the water supply pipe to which is connected the pipe 3 of my valve.

Closing the end of the water pipe 2 is a valve 4 the valve rod 5 of which has attached to its upper screw-threaded end a diaphragm 6, within a chamber 7. The air pipe 1 communicates with the upper side of the diaphragm chamber 7 and the air pressure in the said pipe normally exerted upon diaphragm 6, forces the valve 4 downward and keeps it normally seated against the pressure of water in pipe 2.

8 is a section of the air pipe, connected at its lower end to the upper part of the chamber 7, while its upper end bends over and downward and is connected to a valve chamber 9 within which is a float valve 10.

In the operation of the system, when the water has entered the distributing pipes and the pipe 1, which is connected to the distributing pipes and to the valve as seen in Fig. III, it is prevented from entering the chamber 7, by the float valve 10, which will rise and close the end of the pipe 8, thus preventing the water from entering the pipe 8 and reaching the diaphragm and exerting a backward force on the top of the diaphragm. The air being under pressure in the pipe 1, it enters the valve chamber 9, passes from there through the air pipe 8 and presses downward upon the diaphragm 6, carrying with such diaphragm the valve rod 5 and consequently the valve 4, thus normally closing the end of the water pipe 2.

In the lower end of the air pipe 8 (see Fig. II) is a bushing 11. The upper end of the valve rod 5 is formed with a cylindrical rack 5ª, and pivoted on the bushing 11 is a dog 12, adapted to engage with the cylindrical rack 5ª, for the purpose of keeping the valve 4 in elevated position when said valve is once opened and the valve rod has been elevated through upward pressure of the water on the diaphragm. In the pipe 8 is a nipple 13, provided with an opening through its center, through which opening passes a wire 14 connected at one end to the dog 12, and at its other end to a cap 15 secured upon the nipple, whereby, when it is desired to close the valve 4, the dog may be released by removing the cap 15, and drawing the dog out of engagement with the cylindrical rack by means of the wire 14.

The pipe 3 is connected to a pipe 16, that has direct communication with the system of pipes 16ª extending throughout the building. Within this pipe 16 is a check valve 17 hinged at 18 to the inside of the pipe, which valve is normally closed, thus shutting out all air from the pipe 3, but when the pressure of water commences to pass through the pipe 3, it raises said valve 17, and holds it open, allowing the free passage of water into the system of pipes throughout the building.

19 is a drain pipe in the pipe 16, to whose outer end is secured a drip chamber 20, provided with a drain-cock 21. In the upper end of the drip chamber 20 are metallic plugs 22, to which are connected electric wires 23 through which an electric current is established when the water in the drip cup reaches the lower contact points of the plugs 22, connecting such points and ringing an alarm, drawing attention to the duty of draining the drip-chamber 20, so that the water will not rise through the pipe 19, and stand in the pipe 16, where in the normal condition, there is only a pressure of air.

24 represents a drain pipe located in the pipe 3, and provided with a drain-cock 25. From the pipe 24 extends a pipe 26, to whose outer end is secured a valve chamber 27, containing a float-valve 28. When the valve 4 has been closed, any water that may remain in the pipe 3 may drip down through the pipe 24 and from there pass through the pipe 26 into the valve chamber 27, and should there be enough of such drainage water to fill the pipes and the valve chamber, the float valve 28, provided with a copper top, will rise and its top will come in contact with the lower contact ends of two metallic plugs 29, in the upper end of the valve chamber, which are connected with wires 30 leading to an alarm 31, whereby, when the contact is made, the alarm will be rung.

Secured to the diaphragm 6 is a rod 32 connected to a valve 33; the object of this valve being to give more rapid vent to the air from the diaphragm chamber when a fuse has burned out in the system of pipes, and the air has begun to escape, allowing the pressure of water to raise the diaphragm.

The operation of my valve is as follows:— The parts being in normal, closed position, and that shown in Fig. I of the drawings, in which case the force of the air pressure is exerted on the different valves, should a fire break out in any portion of a building equipped with the extinguisher, one of the fuses in the system of pipes will burn out, causing a vent and allowing air to escape, thus reducing the pressure exerted against the diaphragm 6, and as soon as the pressure of air becomes less than the pressure of water, the valve 4 will be forced away from the pipe 2, allowing the water to escape and run through the pipe 3 into the pipe 16, and from there through all of the system of pipes, reaching the fire wherever an opening has been caused by the heat of the fire.

The vent valve 33 in the diaphragm chamber 7 performs another purpose than the one above described, that is, it prevents any water that may find its way past the float valve 10, in the valve chamber 9, from exerting any great pressure upon the diaphragm valve, and thus tending to close the water pipe valve when the device is in operation. The water that may find its way into the chamber 7, will, when the vent valve is open, as rapidly flow out through this vent valve.

To provide against the water that may escape past the float valve 10 entering the chamber 7, I provide a valve 5ᵇ on the rod 5, which seats against the lower end of the air pipe 8 when the water pipe valve is open, thus preventing any such water from entering on top of the diaphragm and exerting pressure from above on said diaphragm.

I claim as my invention—

1. In a valve for fire extinguishers, one or more water distributing pipes, a valve pipe 3 connected to a water supply pipe, a valve closing the water pipe, a rod connected to said water pipe valve and to a diaphragm, a detent for holding the rod in elevated position consisting of a cylindrical rack on said rod and a pivoted dog that engages said rack, and an air pipe having connection with the pipe extinguisher; and having openings closed by fusible plugs; substantially as set forth.

2. In a fire extinguisher valve the combination with the water supply pipe, having openings closed by fusible plugs, the pressure pipe connected therewith the valve for controlling the passage of water from the supply pipe, the pressure diaphragm subject to the pressure of the pressure pipe and having connection with the water valve, and the support for automatically supporting the diaphragm when it is raised, for the purpose of holding the water valve open, consisting of the cylindrical rack connected with said diaphragm, a pivoted gravitating pawl resting against said rack, a withdrawing cord attached to the pawl and a cap with which said cord is attached and by which the cord may be drawn to disengage the pawl, all substantially as set forth.

3. In a valve for fire extinguishers, the combination with one or more water distributing pipes, of a pipe 3, connected to a water supply pipe, a valve for closing the water supply pipe, a diaphragm, and connection between the water pipe valve and diaphragm, and a vent valve in the diaphragm chamber connected to and operated by the diaphragm; substantially as set forth.

4. In a fire extinguisher, the combination of the pipe 3 formed with the lower horizontal part and the vertical side arms uniting at top for the connection of the distributing pipes, the supply pipe connecting centrally with said lower horizontal portion and having the valve for closing it, the pressure operated controlling diaphragm mounted in a suitable casing upon the horizontal portion of the pipe 3 and between the vertical arms and the electrical leak alarm having a circuit closing float mounted in a chamber with pipe connection to the lower part of the horizontal portion of the pipe 3, all substantially as and for the purpose set forth.

SAMUEL S. ADKINS.

In presence of—
 ALBERT M. EBERSOLE,
 ED. S. KNIGHT.